(12) United States Patent
Charlas

(10) Patent No.: US 11,137,374 B2
(45) Date of Patent: Oct. 5, 2021

(54) TOOL FOR NON-DESTRUCTIVE INSPECTION OF A FLAT PART

(71) Applicant: SAFRAN AIRCRAFT ENGINES, Paris (FR)

(72) Inventor: Mathieu Julien Charlas, Yerres (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 252 days.

(21) Appl. No.: 16/223,441

(22) Filed: Dec. 18, 2018

(65) Prior Publication Data
US 2019/0187100 A1 Jun. 20, 2019

(30) Foreign Application Priority Data
Dec. 18, 2017 (FR) ...................................... 1762349

(51) Int. Cl.
*G01N 29/22* (2006.01)
*G01N 29/28* (2006.01)
(Continued)

(52) U.S. Cl.
CPC ............ *G01N 29/223* (2013.01); *B25J 15/08* (2013.01); *G01N 29/043* (2013.01);
(Continued)

(58) Field of Classification Search
CPC .. G01N 29/225; G01N 29/226; G01N 29/223; G01N 29/26; G01N 29/265
(Continued)

(56) References Cited

U.S. PATENT DOCUMENTS 3,602,036 A * 8/1971 Peterson ................ G01N 29/27
73/633
5,007,291 A * 4/1991 Walters ................ G01N 29/043
226/176
(Continued)

FOREIGN PATENT DOCUMENTS

CN 102670256 A 9/2012
CN 205333133 U 6/2016
(Continued)

OTHER PUBLICATIONS

Preliminary Search Report and Written Opinion dated Jul. 19, 2018, for French Application No. 1762349, filed Dec. 18, 2017, 8 pages.

*Primary Examiner* — John Fitzgerald
*Assistant Examiner* — Truong D Phan
(74) *Attorney, Agent, or Firm* — Christensen O'Connor Johnson Kindness PLLC

(57) ABSTRACT

A tool enables non-destructive inspection of a flat part by ultrasonic transmission. The tool includes a clamp with a first arm pivotally coupled to a second arm about a pivot connection. An ultrasound transmitter is coupled to a first end of the first arm by a first ball joint connection, and an ultrasound receiver coupled to a first end of the second arm by a second ball joint connection. The transmitter has an active face for transmitting a sound signal that is received by an active face of the receiver. The active faces of the transmitter and the receiver are substantially at the same distance from the pivot connection. The tool further includes an alignment device that maintains the active faces of the transmitter and the receiver oriented towards each other and substantially parallel.

12 Claims, 4 Drawing Sheets

(51) Int. Cl.
  *G01N 29/04* (2006.01)
  *B25J 15/08* (2006.01)
  *G01N 29/26* (2006.01)
  *G01N 29/265* (2006.01)

(52) U.S. Cl.
  CPC ......... *G01N 29/225* (2013.01); *G01N 29/226* (2013.01); *G01N 29/26* (2013.01); *G01N 29/265* (2013.01); *G01N 29/28* (2013.01); *G01N 2291/102* (2013.01); *G01N 2291/2632* (2013.01); *G01N 2291/2693* (2013.01)

(58) Field of Classification Search
  USPC .................................................. 73/633–634
  See application file for complete search history.

(56) References Cited

U.S. PATENT DOCUMENTS

| | | | | |
|---|---|---|---|---|
| 6,550,334 | B2* | 4/2003 | Kodama | B23K 13/025 73/622 |
| 7,047,809 | B2* | 5/2006 | Cobb | G01N 29/032 73/599 |
| 2014/0305216 | A1* | 10/2014 | Hafenrichter | G01N 29/265 73/598 |
| 2016/0320348 | A1* | 11/2016 | Boudreau | G01N 29/11 |
| 2017/0311923 | A1* | 11/2017 | Saberi | G01S 7/52079 |
| 2018/0172642 | A1* | 6/2018 | Barry | G01N 29/043 |
| 2019/0242851 | A1* | 8/2019 | Sinha | G01H 11/06 |
| 2019/0258841 | A1* | 8/2019 | Rasmussen | G06F 21/32 |
| 2020/0049664 | A1* | 2/2020 | Nara | G01N 29/225 |
| 2020/0107114 | A1* | 4/2020 | Lee | G01N 29/04 |

FOREIGN PATENT DOCUMENTS

| | | |
|---|---|---|
| DE | 4205360 A1 | 8/1993 |
| EP | 1794653 A1 | 6/2007 |
| EP | 1974771 A1 | 10/2008 |
| FR | 3 003 953 A1 | 10/2014 |

* cited by examiner

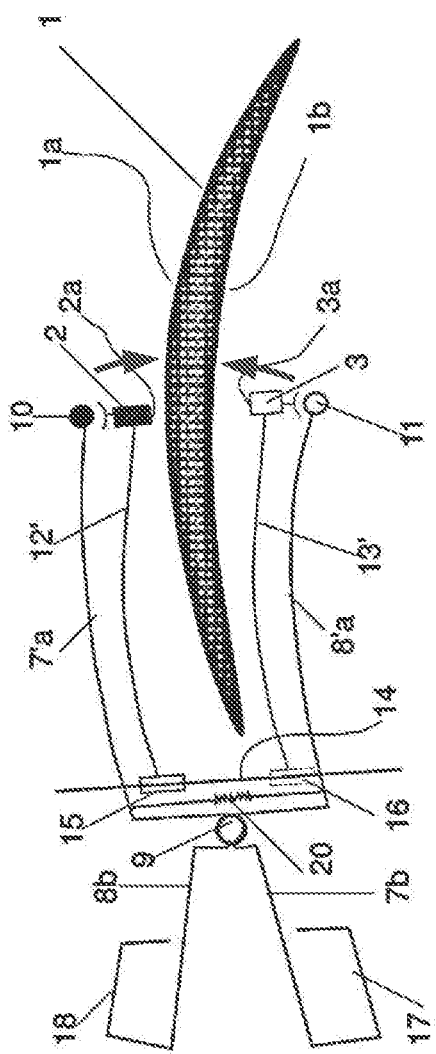
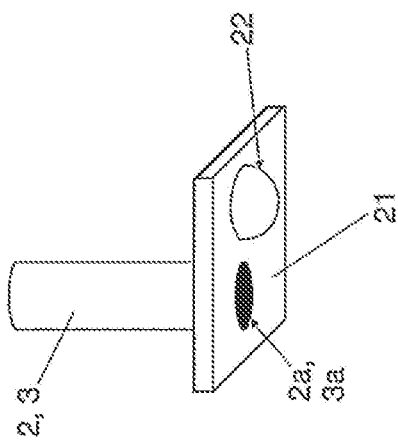
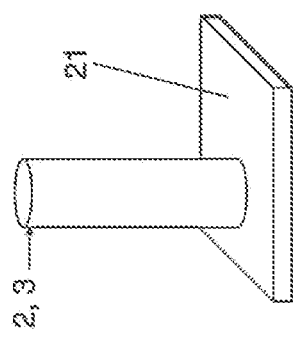

TOOL FOR NON-DESTRUCTIVE INSPECTION OF A FLAT PART

BACKGROUND

The present disclosure is directed to the field of ultrasonic surveillance systems of elements of a turbine engine. It concerns more particularly the use of transmission-based acoustic inspection technology on a thin element such as a vane or a blade of a turbine engine.

An aircraft engine comprises several bladed wheels that are potentially exposed to high stresses that could lead to the loss of a blade. It is therefore important to be able to conduct frequent inspections of these elements, and in particular to conduct under-the-wing inspections of the blades of the engine, outside maintenance operations that require the removal of said engine.

The non-destructive inspection of these types of parts by acoustic inspection methods is known. At least two methods can be used: reflection-based methods and transmission-based methods.

In reflection-based methods, the transmitter and the receiver are installed on the same side of the part being inspected. One such automatic system for the detection of defects on a rotating element of an aircraft engine processes reflections to deduce the existence of defects by exploiting the response variations according to the location on the blade. This system features the advantage of being able to be automated. However, this system requires an adapted design of the inspected element. On one hand this is not always the case on existing equipment, on the other hand external constraints can prevent doing so.

In transmission-based methods, the receiver is located on the other side of the part with respect to the transmitter, and the presence of a defect is directly detected by variations of the received signal when the transmitter/receiver passes in the vicinity of said defect. The transmission-based methods feature several advantages, namely the simplicity of the transmitter and of the receiver, the absence of ambiguity in the information of the receiver and versatility, the same device being used for an entire range of materials or parts. The vanes or the blades of an engine, owing to their reduced thickness, enable to easily place the transmitter and the receiver on either side to implement the method.

However, this type of method has two constraints: firstly, a medium (water or a gel) that conducts ultrasonic waves must be placed between the part and the transducers, and secondly the transmitter and the receiver must be properly aligned. To take these constraints into account, it is known to conduct the transmission-based acoustic inspection with two synchronized robots in order to place the transmitter and the receiver on either side of the blade undergoing inspection. The use of robots is required to ensure the proper alignment of the transmitter and the receiver. Furthermore, each robot is connected to a water jet that sprays the surface of the blade undergoing testing in order to serve as a sound transmission medium. The excess water is then collected in a container under the robots. As such this solution is thus unsuitable for under-the-wing use.

The purpose of the disclosed tool is to enable the inspection of a blade still mounted on its engine by taking advantage of the simplicity of the transmission-based acoustic inspection technology, with means that can be easily implemented, without affecting the design of the engine undergoing inspection and without requiring it to be placed on a robotized testbed.

SUMMARY

The present disclosure is directed tooling (or tool) intended for the non-destructive inspection of a flat part of a turbine engine, in particular of a blade, using an ultrasonic transmission-based technology, comprising an ultrasound transmitter and an ultrasound receiver, characterized in that the tooling comprises a clamp comprising a first arm articulated with a second arm by means of a pivot connection, the transmitter being connected by a ball-joint connection to a free end of the first arm and the receiver being connected by a ball-joint connection to the free end of the second arm, the assembly being configured so that an active face of the transmitter, configured to emit the sound signal, and an active face of the receiver, configured to receive the sound signal, are substantially at the same distance from the pivot connection, and in that the tooling further comprises an alignment device carried by the clamp, configured to maintain said active faces oriented one towards the other and substantially parallel for various spacing distances of the arms and various orientations of the transmitter and of the receiver on the ball-joint connections.

The active face, or head, of the transmitter or of the receiver is the face through which the ultrasonic waves are transmitted between the latter and the part. The clamp, with the ball connection, enables the active faces of the transmitter and of the receiver to be positioned by pressing them against opposite faces of the part at different locations to inspect the part by applying a transmission-based method. The ball-joint connection at the end of the arms enables the transmitter and the receiver to be correctly oriented with respect to the opposite faces of the part, and the alignment device achieves this by respecting the alignment requirement according to the different spacing distances and the different attitudes of the clamp with respect to the part.

The clamp can therefore be handled by an operator to move the transmitter and the receiver through various locations along the profile of the flat part, especially a blade of a turbine engine, without requiring a complex robotized device to ensure the alignment of the receiver and transmitter. This type of non-destructive inspection can therefore easily be conducted on an aircraft, without requiring disassembly operations.

In the present application, the term "flat part" describes a part that features, at least partially, a reduced thickness, and in particular a material thickness of ten centimeters or less.

In one embodiment, the alignment device comprises a first rail embedded at one end on the transmitter, a second rail embedded at one end on the receiver, and a third rail, straight and substantially perpendicular to a median axis positioned in between the two arms, the first and the second rail each being connected to the third rail by means of a sliding connection along the third rail.

The first and the second rails may carry the sliding connection on the end opposite the end where the receiver or the transmitter is secured.

Therefore, the sliding of the two first rails along the third rail enables to define the alignment direction of the active faces of the transmitter and of the receiver. This rail device is easy to achieve, and it remains light and following the orientation of the arms of the clamp, which provides good handling properties of the tooling by an operator.

Advantageously, the third rail may be positioned in the vicinity of the pivot connection by the sliding connections with the first and second rail.

The term "vicinity of the pivot connection" is used to describe the fact that the distance between the pivot connection and the third rail is reduced with respect to the length of the arms supporting the transmitter and the receiver, typically less than a tenth of the latter. This is made possible by the fact that the spacing distance on the first and second rails between the sliding connection and the embedded end on the transmitter or the receiver is substantially equal to the distance separating said transmitter or receiver from said pivot connection.

Thus, this frees the space between the arms, from the pivot connection to the ends, which enables to slide the flat part between the arms, to position the transmitter and the receiver at the center of this part, for example.

In a variant, the alignment device comprises magnetic means on the transmitter and the receiver that are configured to attract the active faces of the latter one towards the other.

The first arm and the second arm each may include a first segment carrying the ball-joint connection that extends along a privileged direction and a second segment that connects the first segment to the pivot connection, by offsetting the latter with respect to the privileged direction, for example by forming an "L", so as to maintain a substantially constant distance between said two first segments of each arm for a low spacing thereof.

This enables the passage of the flat part between said first segments for a spacing of the arms that is close to that wherein the active faces of the transmitter and the receiver are in contact with the two opposite faces of the part. Therefore, the corrections to perform by the alignment device are reduced between various end positions on the part, which makes the device easier to manufacture. In particular for the rail system, it prevents excessive movements of the sliding connections on the third rail. Excessive movements could cause the slides to come and abut against the arms, for example.

The first segments of the arms may be curved in the same direction with respect to a median axis of the clamp, so as to follow the profile of a curved flat part.

The curvature of the arms allows for reduction of the spacing between the arms for the position in which the transmitter and the receiver are pressed against the opposite faces of the part. This serves both to reach points on the part that are at a maximum distance as possible with a given extension of the arms and to reduce the constraints on the alignment device.

The tooling may optionally comprise an elastic means configured to return the arms one towards the other when, at their free end, there is non-nil spacing between the active faces of the transmitter and of the receiver.

This releases the operator from the task of applying the transmitter and the receiver against the part, which is therefore performed by the elastic means of the tooling. The operator is then able to concentrate itself on the positioning of the inspected locations of the part.

The tooling may comprise a plate with which the active face of the receiver and/or of the transmitter is flush, and carrying a positioning pin intended to come into contact with the corresponding face of the part, so as to maintain a constant distance between the part and the active face during a displacement with contact with the part.

In one embodiment, the pin has a rounded end in order to avoid damaging the part. More preferably still, it is made of Teflon or another material that is conducive to sliding.

In one embodiment, the positioning pin is offset on the plate with respect to the active face of the transmitter, and respectively of the receiver, so as to allow the passage of a hydroacoustic gel between said active face and the corresponding face of the part.

The tooling may comprise gripping means configured to allow an operator to act on the spacing of the arms and placed on the other side of the pivot connection with respect to the arms.

The positioning on the other side of the arms enables, in particular, to configure relatively thin arms, in order to slide them between two successive blades during the non-destructive inspection of a bladed wheel.

The present disclosure further concerns the use of a tooling as described above, for the non-destructive inspection of a flat part of a turbine engine.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 6 shows a schematic view of a tooling according to a fourth embodiment of the present disclosure, wherein the tooling is installed around a blade, represented in cross-section, in a measurement position corresponding to that of FIG. 2;

FIG. 7 shows a top isometric view of a representative embodiment of a transmitter or acoustic receiver according to the present disclosure; and FIG. 8 shows a bottom isometric view of a transmitter or acoustic receiver shown in FIG. 7.

DETAILED DESCRIPTION

While illustrative embodiments have been illustrated and described, it will be appreciated that various changes can be made therein without departing from the spirit and scope of the invention.

Figure 1A:
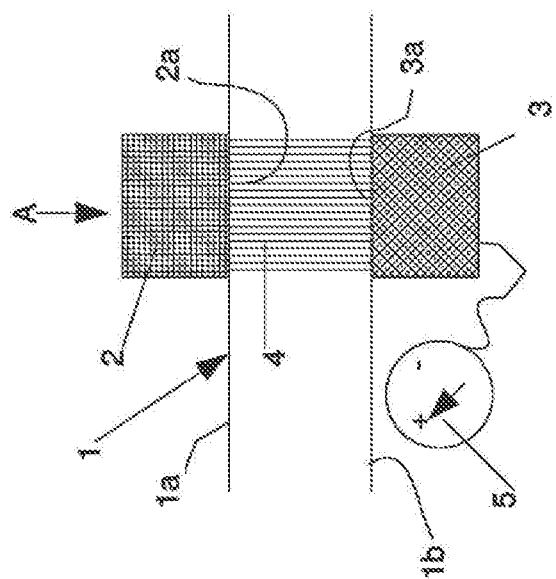
FIGS. 1A and 1B shows a schematic view of the principle of a transmission-based acoustic inspection method.
Figure 1B:
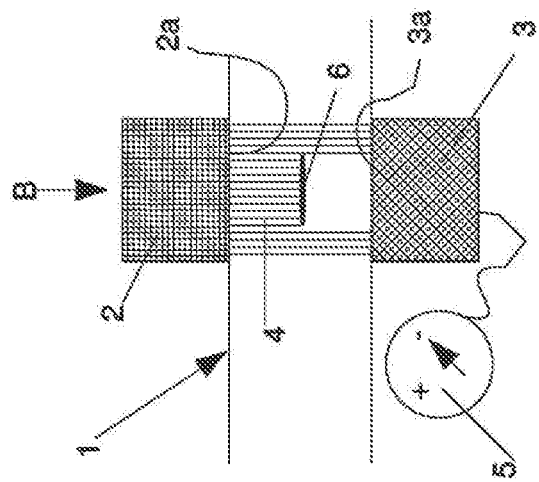

The tooling according to the invention is intended to implement a method of transmission-based acoustic inspection of a part, between two opposite faces of a part. The principle of the method, more specifically adapted to flat parts, is well known. In a very schematic manner and by way of a reminder, with reference to FIGS. 1A and 1B, the method consists in passing the part 1 between an ultrasonic transmitter 2 and an ultrasonic receiver 3, placed one facing the other and in front of two opposite faces 1a, 1b of the part 1. The transmitter 2 sends an ultrasonic flow 4 which passes through the part 1 and is picked-up by the receiver 3. If the part 1 does not present defects in the section between the transmitter 2 and the receiver 3, as indicated for position A (FIG. 1A), the acoustic flow 4 travels through the part 1 with reduced attenuation and a processing and display device 5 indicates that the receiver 3 receives a signal of maximum intensity. If there is a defect 6 on the path between the transmitter 2 and the receiver 3, as indicated for position B (FIG. 1B), it will create a shadow and the processing device 5 connected to the receiver 3 will record a sudden drop of the received acoustic energy.

As mentioned in the introduction, the method is simple and easy to interpret, in particular as it is not very sensitive to thickness variations between the two opposite faces 1*a*, 1*b*. However, its proper functioning depends on maintaining optimal and constant transfer conditions between the transmitter 2 and the receiver 3 in the course of their movements over the part 1. For this purpose, it is particularly important to maintain, firstly, a constant alignment of the transmitter 2 and the receiver 3 and, secondly, a constant coupling of the active faces 2*a*, 3*a* of the latter with the material of the part. The active face or head of the transmitter or receiver is the face through which the ultrasounds travel as they enter or exit the part. To guarantee this last point, it is known to use a layer of water, maintained by continuous spraying, or a gel that coats both the face 1*a*, 1*b* of the part 1 and that 2*a*, 3*a* of the transmitter 2 or of the receiver 3. These means are not shown in FIG. 1.

Figure 2:
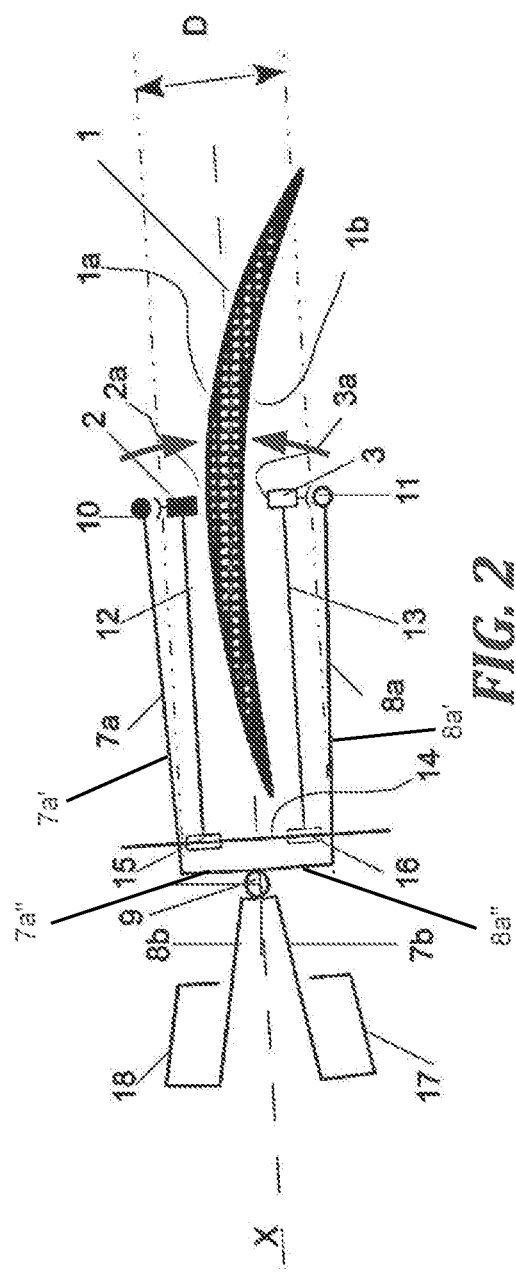
FIG. 2 shows a schematic view of a tooling according to a first embodiment of the present disclosure, wherein the tooling is installed in a first measurement position around a blade represented in cross-section.

In reference to FIG. 2, a first representative embodiment of the tooling corresponds to a clamp, advantageously easy to handle by an operator, that comprises a first branch 7*a*-7*b* and a second branch 8*a*-8*b* that are rotationally articulated by means of a pivot connection 9. On one side of the pivot connection 9, the first 7*a*-7*b* and the second 8*a*-8*b* branches respectively form first 7*a* and second 8*a* arms substantially symmetrical to a median axis X between the two branches. Advantageously, each arm 7*a*, 8*a* has substantially the form of an L wherein a first segment (7*a*' and 8*a*', respectively) of the L comprises the free end of the arm 7*a*, 8*a* and a second segment (7*a*'' and 8*a*'', respectively) of the L, connected to the pivot connection 9, is substantially perpendicular to the first segment, so as to offset it with respect to the pivot connection 9. Therefore, for a position where the aperture angle between the two branches is reduced, the first segment of the L extends longitudinally in parallel with the median axis X, at a distance substantially equal to that of the first segment.

This configuration enables, based on the extension of the first part of the L, to maintain a significant and substantially constant gap D between both arms on the major part of the extension of the arms 7*a*, 8*a*, along the median axis X.

An ultrasound transmitter 2 is connected to the free end of the first arm 7*a* by means of a first ball-joint connection 10 and an ultrasound receiver 3 is connected to the free end of the second arm 8*a* by a second ball-joint connection 11. The active face 2*a* of the transmitter 2 and that 3*a* of the receiver 3 are arranged on a free end of the latter, so as to be perpendicular to a line connecting them to the ball-joint connection 10, 11.

The connection means, not represented, connect the transmitter 2 and the receiver 3 to the electronic devices that enable, on one hand, to operate the transmitter and, on the other hand, to process the signal received by the receiver to apply the inspection method. These electronic devices are known and are not included in the scope of the invention. In terms of the connection means, they can be wireless means, or wires that extend along the branches and reach the electronic devices.

The tooling is arranged so that the active faces 2*a*, 2*b* are turned to face one another. In the presented embodiment, the alignment condition of the transmitter 2 and the receiver 3 is achieved by the following mechanical device.

A first rail 12 is embedded in a first end on the transmitter 2 and extends transversally, substantially perpendicular in FIG. 2, to a line connecting the ball-joint connection 10 to the active face 2*a* of the transmitter 2.

A second rail 13 is embedded in a first end on the receiver 3 and extends transversally, substantially perpendicular in FIG. 2, to a line connecting the ball-joint connection 11 to the active face 3*a* of the receiver 3.

The first 12 and the second 13 rails are each connected, here at their second ends, to a third rail 14 by a sliding connection 15, 16 extending along said third rail 14.

On one hand the third rail 14 is straight. On the other hand, the rails 12, 13, 14 are configured so that the third rail 14 is mainly perpendicular to the median axis X of the clamp. In FIG. 2, it is substantially perpendicular. The rail system connects the movements of the transmitter 2 and of the receiver 3 around the ball-joint connections 10, 11 at the free end of the arms 7*a*, 7*b*, by ensuring that the third rail 14 maintains an alignment direction of the active faces 2*a*, 2*b* of the transmitter 2 and of the receiver 3 on a transversal line parallel to the third rail. This device thereby enables to align the receiver 2 and the transmitter 3 for a large range of aperture angles of the arms 7*a*, 8*a* and coupled inclination variations of the receiver 3 and of the transmitter 2 on the ball-joint connection 10, 11. In other words, the movements induced by the ball-joint connections 10 and 11 are connected to the movements induced by the alignment device carried by the clamp.

In the illustrated embodiment, the rails 12, 13, 14 are configured so that the third rail 14 is positioned in the vicinity of the pivot connection 9 between the two branches 7*a*-7*b* and 8*a*-8*b*. This makes it possible to clear the space between the arms 7*a*, 8*a* substantially over the entire length of their longitudinal extension along the median axis X. This also provides an important lever arm to mechanically ensure the accuracy of the alignment between the transmitter 2 and the receiver 3.

In the illustrated embodiment, each branch 7*a*-7*b*, 8*a*-8*b* comprises an extension 7*b*, 8*b* on the other side of the pivot connection 9 with respect to the arms 7*a*, 8*a*. This extension 7*b*, 8*b* comprises a handle 17, 18 enabling the gripping of the clamp and its handling by an operator.

Figure 3:
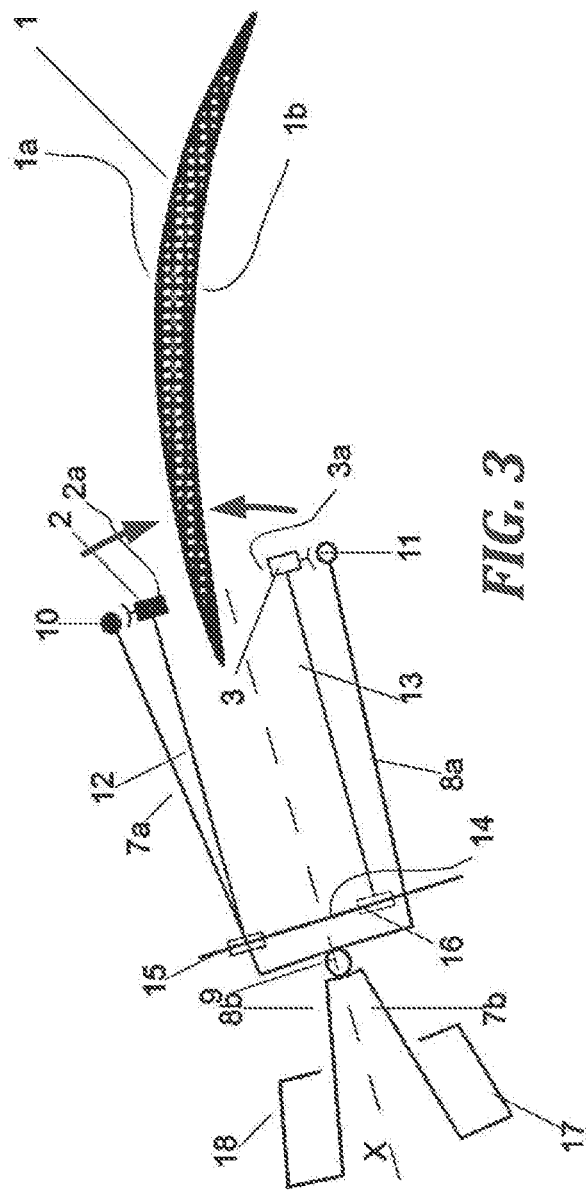
FIG. 3 shows a schematic view of the tooling of FIG. 2, wherein the tooling is installed in a second measurement position around a blade represented in cross-section.

As indicated in FIGS. 2 and 3, the design of the clamp enables introduction of a flat part 1, for example a blade, between the two arms 7*a*, 8*a* to positioning the transmitter 2 and the receiver 3 on two opposite faces 1*a* and 1*b*, for example the extrados and the intrados, from one end to the center of the part 1 following a cut plane. In FIG. 2, the gap D and the longitudinal extension of the arms 7*a*, 8*a* enable the tooling to reach points located at the center of the part 1. Between the position in FIG. 2 and that in FIG. 3, the spacing of the arms 7*a*, 8*a* varies to press the active faces 2*a*, 3*a* of the transmitter 2 and of the receiver 3 against the part 1.

As indicated in FIGS. 2 and 3, when the free ends of the arms 7*a*, 8*a* are moved over the part 1 while maintaining the active faces 2*a*, 2*b* of the transmitter 2 and of the receiver 3 in contact with the part 1, it causes the latter to move around the ball joint connections 10, 11 to maintain this contact. This occurs for at least two reasons:

firstly, the faces 1*a*, 1*b* of a part 1, such as a blade, are not parallel and their orientations vary slightly;

secondly, the operator does not necessarily secure the exact same position, and this position can be slightly offset with respect to the median line of the part 1 for example.

The alignment system with the rails 12, 13, 14 described above acts in this case to force the transmitter 2 and the receiver 3 to move around their respective ball-joint connections 10, 11 in order to remain aligned while maintaining the contact with the part 1.

It should be noted that this clamp does not rely on heavy mechanical systems. Furthermore, the state of the art is capable of manufacturing of miniaturized transmitters 2 and receivers 3. The tooling is therefore easy to handle by an operator who holds it by its handles 17, 18.

Figure 4:
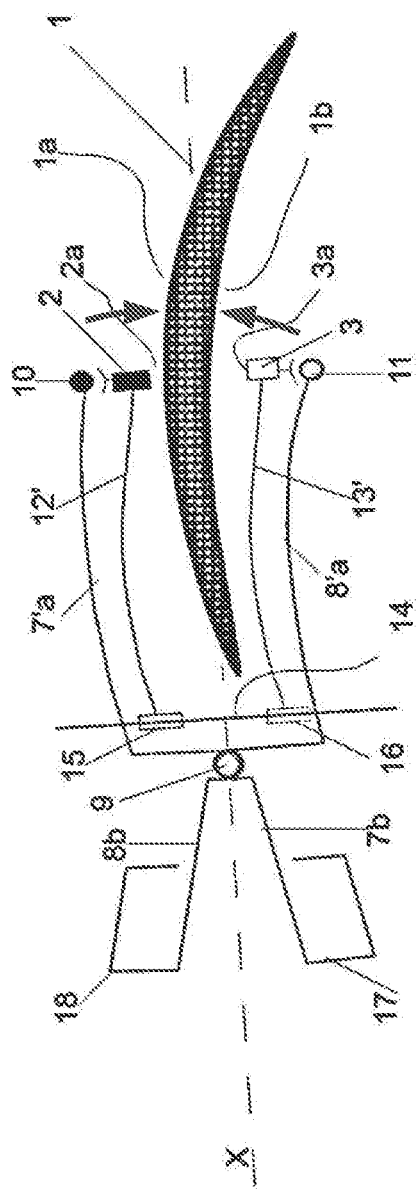
FIG. 4 shows a schematic view of a tooling according to a second embodiment of the present disclosure, wherein the tooling is installed around a blade, represented in cross-section, in a measurement position corresponding to that of FIG. 2.

FIG. 4 shows a first alternate embodiment in which the arms 7'a, 8'a, while maintaining the same extension along the median axis X to bring the transmitter 2 and the receiver 3 face-to-face as they are moved closer to one another, can be curved, in a direction corresponding substantially to the curvature of the blade 1 to be inspected, with respect to said axis X. In this case, the first 12' and second 13' rails advantageously also have a curved shape in the same direction as that of the arms 7'a, 8'a. This variant, in which the clamp is not symmetrical with respect to a median axis, allows for limiting the range of movement of the branches 7'a-7'b, 8'a-8'b so that they fit the shape of a blade 1. In particular, a reduced range of movement, i.e. a clamp with a small aperture, enables to prevent the third rail 14, which is straight and similar to that of the preceding embodiment to ensure the alignment of the transmitter 2-receiver 3 couple, from abutting against the pivot point 9 between the branches.

Figure 5:
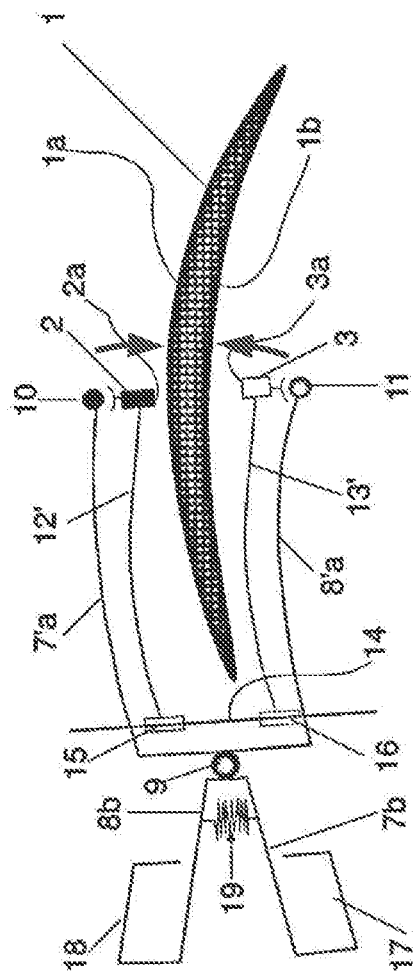
FIG. 5 shows a schematic view of a tooling according to a third embodiment of the present disclosure, wherein the tooling is installed around a blade, represented in cross-section, in a measurement position corresponding to that of FIG. 2.

Alternate embodiments are contemplated to include a return means (element) of the branches to close their opening and bring the transmitter to the receiver. With reference to FIG. 5, this means can be a spring 19 operating by compression and installed between the part 7b, 8b, of the branches opposite the arms 7'a, 8'a. In the embodiment shown in FIG. 6, it is a spring 20 operating by tension and installed between the arms 7'a, 8'a. The shape and the strength of the spring 19, 20 can be defined, in both cases, so as to press the transmitter 3 against the receiver 3 while preventing the arms to cross over one another if the clamp is released.

The advantage of this improvement is that it facilitates the handling of the tooling. The operator must concentrate itself on the positioning of the transmitter 2 and of the receiver 3, but can let the tooling apply the transmitter 2 and the receiver 3 against the two opposite faces 1a, 1b of the part 1 to ensure the contact required for the application of the acoustic inspection method.

Another aspect of the invention concerns the acoustic coupling condition of the transmitter 2 and of the receiver 3 with the face 1a, 1b of the part on which each is applied. Preferably, a medium, generally a hydraulic gel, is spread over the surface of the part 1 so as to fill the space between the corresponding face 1a, 1b and the transmitter 2 or the receiver 3. The medium can therefore correctly transmit the acoustic signal between said face 1a, 1b of the part and the active face 2a, 3a of the transmitter 2 or of the receiver 3.

For this purpose, the transmitter 2 and the receiver 3 being aligned by the arrangement of rails 12, 13, 14 described above, the transmitter 2 and the receiver 3 are provided with devices that ensure that the active face 2a, 3a of the latter always remain at a substantially constant distance from the corresponding face 1a, 1b when they are moved over the face.

With reference to FIGS. 7 and 8, the transmitter 2 and the receiver 3 are both provided with a plate 21 with which their active face 2a, 3a is flush. The plate is provided with a ball 22 intended to come into contact with the corresponding surface 1a, 1b of the part. The ball 22 has a calibrated height to adjust the distance between the active face 2a, 3a of the transmitter 2 or of the receiver 3 and the surface 1a, 1b of the part. Preferably, the ball 22 is made of Teflon or another material that provides sliding properties on the surface 1a, 1b of the part without damaging the part. Advantageously, the ball 22 is slightly offset to the side with respect to the active face 2a, 2b to avoid chasing the hydraulic gel beforehand deposited on the part during the movement of the active faces 2a, 2b on the surfaces 1a, 1b of the part, during the non-destructive inspection.

According to another aspect of the disclosure, the tooling may be provided with an elastomer protection (for example made of silicone), not represented in the figures, in order to prevent damage to the coatings of the blade 1 caused by the impact of a sharp edge on the surface of the latter.

The description of the embodiments of the invention provided in this document is not limiting. Other forms of clamp arms can be considered. Other gripping means and other clamp aperture control means, comprising a beam for example, can also be considered. It is also possible to consider other means for the alignment of the transmitter 2 and the receiver 3, different from the rail system. For example, a magnetic field system can be adapted to align the transmitter 2 and the receiver 3 for the inspection of a blade made of a composite material. In this case, the tooling, not represented in the figures, comprises a first magnet secured to the transmitter 2 and a second magnet secured to the receiver 3. These two magnets, positioned on either side of the blade, are then configured to emit a magnetic field with sufficient intensity to align the receiver and the transmitter.

While illustrative embodiments have been illustrated and described, it will be appreciated that various changes can be made therein without departing from the spirit and scope of the invention.

The embodiments of the invention in which an exclusive property or privilege is claimed are defined as follows:

1. A tool configured for non-destructive inspection of a flat part by ultrasonic transmission, the tool comprising:
   (a) a clamp comprising a first arm pivotally coupled to a second arm about a pivot connection;
   (b) an ultrasound transmitter coupled to a first end of the first arm by a first ball joint connection and having an active face configured to transmit a sound signal;
   (c) an ultrasound receiver coupled to a first end of the second arm by a second ball joint connection and having an active face configured to receive the sound signal from the transmitter, wherein the active face of the transmitter and the active face of the receiver are substantially at the same distance from the pivot connection; and
   (d) an alignment device coupled to the clamp and configured to maintain the active face of the transmitter and the active face of the receiver oriented towards each other and substantially parallel for various spacing distances of the arms and for various orientations of the transmitter and of the receiver on the first and second ball joint connections, respectively, and wherein the alignment device comprises a first rail coupled at one end on the transmitter, a second rail coupled at one end on the receiver, and a third rail that is straight and substantially perpendicular to a median axis X positioned in between the two first and second arms, the first and the second rails being connected to the third rail by first and second sliding connections, respectively, along the third rail.

2. The tool according to claim 1, wherein the third rail is positioned in the vicinity of the pivot connection by the first and second sliding connections.

3. The tool according to claim 1, where at least one of the first and second arms has an L-shaped form.

4. The tool according to claim 1, further comprising a return means configured to bias the transmitter and the receiver towards each other.

5. Tooling according to claim 1, further comprising at least one gripping element configured to allow an operator to act on spacing of the arms and placed on the other side of the pivot connection with respect to the arms.

6. The tool according to claim 1, further comprising:
(a) a plate with which the active face of one of the receiver and the transmitter is flush, and
(b) a positioning pin coupled to the plate and configured to contact with a corresponding face of the part, so as to maintain a constant distance between the part and the active face when the pin contacts the part.

7. The tool according to claim 6, wherein the positioning pin is offset on the plate with respect to the active face of the one of the transmitter and the receiver to allow the passage of a hydroacoustic gel between the active face and a corresponding face of the part.

8. The tool according to claim 1, wherein the first arm comprises a first segment and a second segment, a first end of the first segment being operably associated with the first ball joint connection, the second segment forming an angle with the first segment and connecting a second end of the first segment to the pivot connection and offsetting the second end of the first segment from the pivot connection and wherein the second arm comprises a first segment and a second segment, a first end of the first segment being operably associated with the second ball joint connection, the second segment forming an angle with the first segment and connecting a second end of the first segment to the pivot connection and offsetting the second end of the first segment from the pivot connection.

9. The tool according to claim 8, wherein the first and second arms maintain a substantially constant distance (D) between the respective first segments of each arm.

10. The tool according to claim 8, wherein said first segments of the first and second arms are curved in the same direction with respect to the median axis (X) of the clamp.

11. A tool configured for non-destructive inspection of a flat part by ultrasonic transmission, the tool comprising:
(a) a clamp comprising a first arm pivotally coupled to a second arm about a pivot connection;
(b) an ultrasound transmitter coupled to a first end of the first arm by a first ball joint connection and having an active face configured to transmit a sound signal, the first arm comprises a first segment and a second segment, a first end of the first segment being operably associated with the first ball joint connection, the second segment forming an angle with the first segment and connecting a second end of the first segment to the pivot connection and offsetting the second end of the first segment from the pivot connection;
(c) an ultrasound receiver coupled to a first end of the second arm by a second ball joint connection and having an active face configured to receive the sound signal from the transmitter, wherein the active face of the transmitter and the active face of the receiver are substantially at the same distance from the pivot connection, the second arm comprises a first segment and a second segment, a first end of the first segment being operably associated with the second ball joint connection, the second segment forming an angle with the first segment and connecting a second end of the first segment to the pivot connection and offsetting the second end of the first segment from the pivot connection; and
(d) an alignment device coupled to the clamp and configured to maintain the active face of the transmitter and the active face of the receiver oriented towards each other and substantially parallel for various spacing distances of the arms and for various orientations of the transmitter and of the receiver on the first and second ball joint connections, respectively and wherein said first segments of the first and second arms are curved in the same direction with respect to the median axis X of the clamp.

12. A tool configured for non-destructive inspection of a flat part by ultrasonic transmission, the tool comprising:
(a) a clamp comprising a first arm pivotally coupled to a second arm about a pivot connection;
(b) an ultrasound transmitter coupled to a first end of the first arm by a first ball joint connection and having an active face configured to transmit a sound signal;
(c) an ultrasound receiver coupled to a first end of the second arm by a second ball joint connection and having an active face configured to receive the sound signal from the transmitter, wherein the active face of the transmitter and the active face of the receiver are substantially at the same distance from the pivot connection;
(d) an alignment device coupled to the clamp and configured to maintain the active face of the transmitter and the active face of the receiver oriented towards each other and substantially parallel for various spacing distances of the arms and for various orientations of the transmitter and of the receiver on the first and second ball joint connections, respectively;
(e) a plate with which the active face of one of the receiver and the transmitter is flush; and
(f) a positioning pin coupled to the plate and configured to contact with a corresponding face of the part, so as to maintain a constant distance between the part and the active face when the pin contacts the part.

* * * * *